(12) United States Patent
French et al.

(10) Patent No.: US 7,231,824 B2
(45) Date of Patent: *Jun. 19, 2007

(54) USE OF ELECTRODES TO CANCEL LIFT EFFECTS IN INERTIAL SENSORS

(75) Inventors: Howard B. French, Falcon Heights, MN (US); Mark W. Weber, Zimmerman, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/382,633

(22) Filed: May 10, 2006

(65) Prior Publication Data

US 2006/0213266 A1    Sep. 28, 2006

Related U.S. Application Data

(63) Continuation-in-part of application No. 10/907,131, filed on Mar. 22, 2005.

(51) Int. Cl.
*G01P 9/04* (2006.01)

(52) U.S. Cl. .................................... 73/504.12

(58) Field of Classification Search ............ 73/504.12, 73/504.14, 504.16
See application file for complete search history.

(56) References Cited

U.S. PATENT DOCUMENTS

| | | | |
|---|---|---|---|
| 5,600,064 A | 2/1997 | Ward | |
| 5,892,153 A | 4/1999 | Weinberg et al. | |
| 5,955,668 A | 9/1999 | Hsu et al. | |
| 5,992,233 A | 11/1999 | Clark | |
| 6,067,858 A | 5/2000 | Clark et al. | |
| 6,164,134 A | 12/2000 | Cargille | |
| 6,230,563 B1 | 5/2001 | Clark et al. | |
| 6,250,156 B1 | 6/2001 | Seshia et al. | |
| 6,311,555 B1 | 11/2001 | McCall et al. | |
| 6,360,601 B1 | 3/2002 | Challoner et al. | |
| 6,370,937 B2 | 4/2002 | Hsu | |
| 6,439,050 B1 | 8/2002 | Musalem et al. | |
| 6,453,743 B1 | 9/2002 | Royle et al. | |
| 6,481,283 B1 | 11/2002 | Cardarelli | |
| 6,481,285 B1 | 11/2002 | Shkel et al. | |
| 6,619,121 B1* | 9/2003 | Stewart et al. ........... | 73/504.12 |
| 6,671,648 B2 | 12/2003 | McCall et al. | |
| 6,675,630 B2 | 1/2004 | Challoner et al. | |
| 7,032,451 B2* | 4/2006 | Geen ....................... | 73/504.14 |
| 2002/0020219 A1 | 2/2002 | DeRoo et al. | |

(Continued)

*Primary Examiner*—John E. Chapman
(74) *Attorney, Agent, or Firm*—McDonnell Boehnen Hulbert & Berghoff LLP

(57) ABSTRACT

Devices and methods for reducing errors in a MEMS-type gyroscope are disclosed. A MEMS-type gyroscope in accordance with an illustrative embodiment of the present invention can include one or more proof masses configured to oscillate in a drive plane above a sense electrode for measuring Coriolis forces exerted on the one or more proof masses resulting from motion of the gyroscope about an input axis. One or more quad steering voltage members can be positioned adjacent each of the one or more proof masses and activated to electrostatically attract the proof masses toward the sense electrodes to reduce any undesired motion of the proof masses due to quadrature and/or temperature effects. The voltage applied to each of the quad steering voltage members can be time-varying, and, in some cases, can be derived from the same voltage signal used to drive the proof masses.

20 Claims, 10 Drawing Sheets

U.S. PATENT DOCUMENTS

| | | |
|---|---|---|
| 2002/0190607 A1 | 12/2002 | Paden et al. |
| 2003/0033850 A1 | 2/2003 | Challoner et al. |
| 2003/0084722 A1 | 5/2003 | Kim et al. |
| 2003/0167842 A1 | 9/2003 | Platt |
| 2003/0200803 A1 | 10/2003 | Platt |
| 2003/0216884 A1 | 11/2003 | Cardarelli |

* cited by examiner

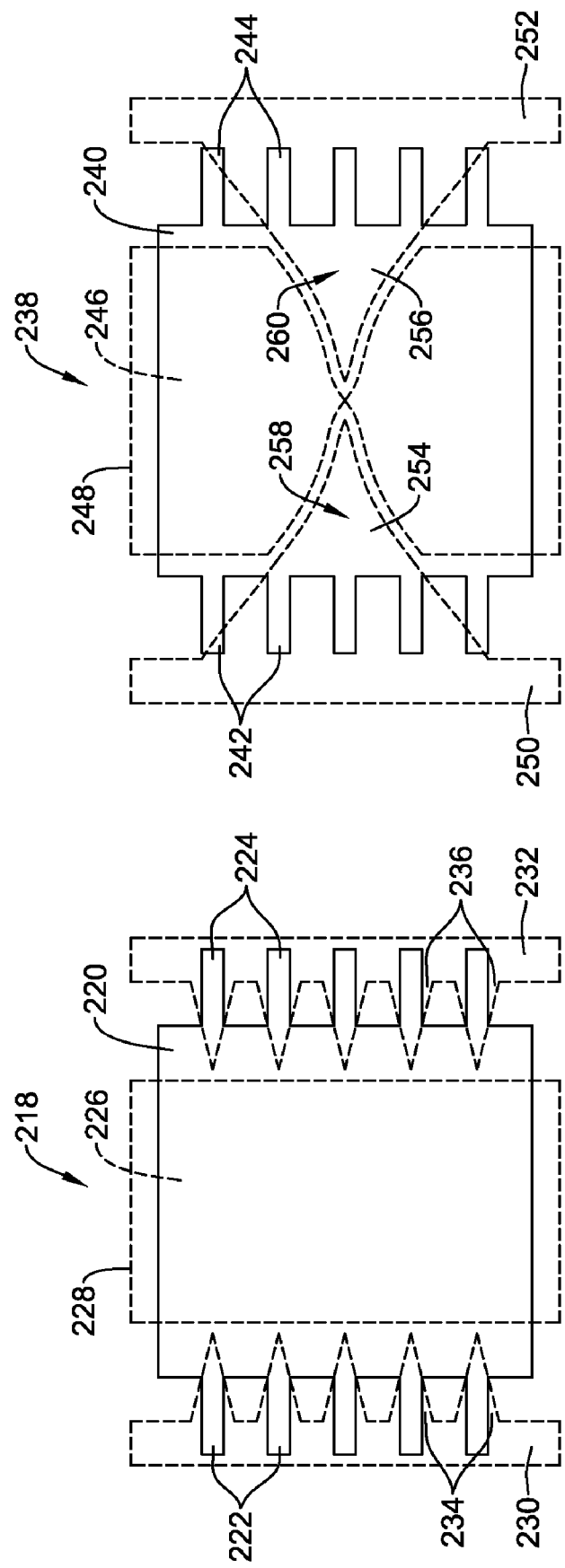

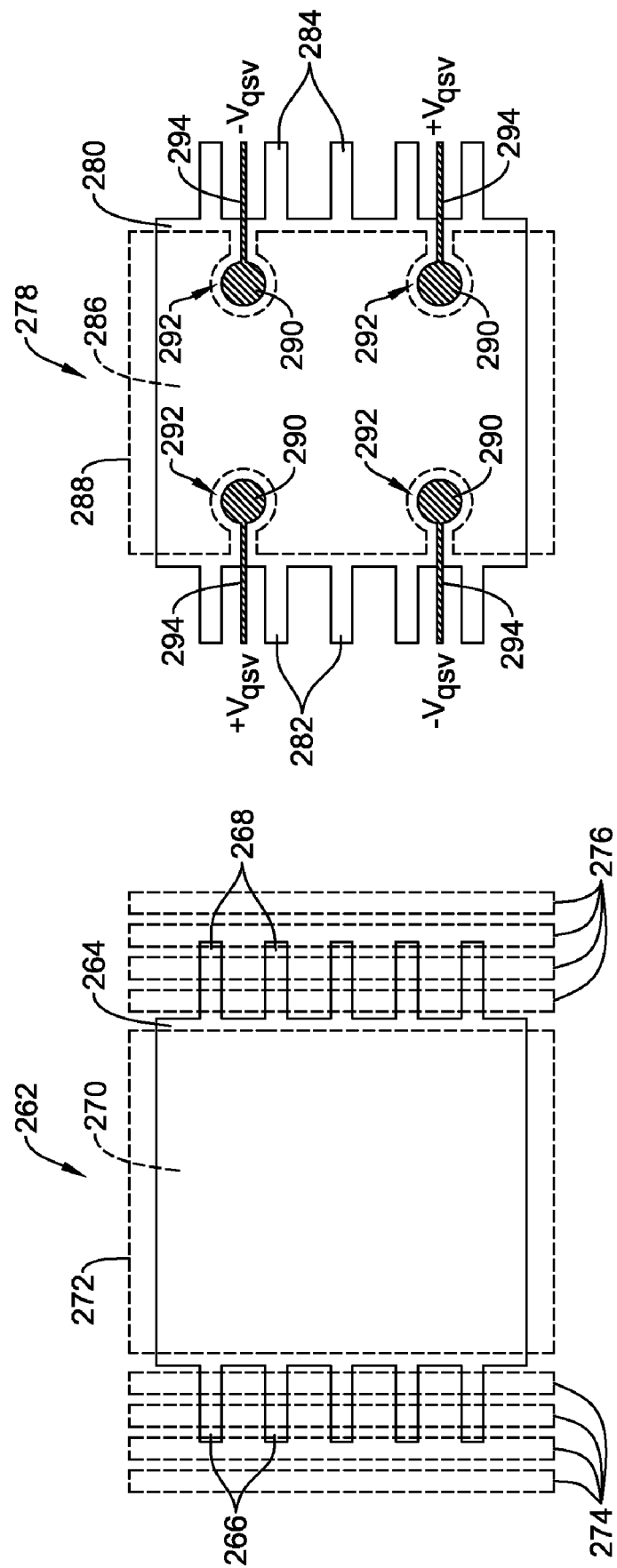

USE OF ELECTRODES TO CANCEL LIFT EFFECTS IN INERTIAL SENSORS

CROSS REFERENCE TO RELATED APPLICATION

The present invention is a continuation-in-part of U.S. patent application Ser. No. 10/907,131, entitled "Quadrature Reduction in MEMS Gyro Devices Using Quad Steering Voltages", filed on Mar. 22, 2005.

FIELD

The present invention relates generally to the field of microelectromechanical systems (MEMS). More specifically, the present invention pertains to error reduction in MEMS-type gyroscopic devices using steering electrodes.

BACKGROUND

Microelectromechanical system (MEMS) gyroscopic devices are utilized in a variety of applications for sensing inertial motion in one or more dimensions. Such devices are particularly useful in applications demanding a high degree of reliability and accuracy where it may be necessary to measure and/or detect small changes in motion or acceleration, or where size and/or weight are important design considerations. In the design of navigational and communications systems, for example, such devices are useful in measuring and/or detecting slight variations in linear and rotational motion of an object traveling through space. Because such devices can be manufactured using batch semiconductor fabrication techniques (e.g. photolithography), greater tolerances and reliability can be achieved in comparison to more traditional fabrication techniques.

The design of MEMS-type gyroscopes varies greatly depending on their particular purpose. Rate gyroscopes, for example, are often used to determine the rate of rotation of a moving object by generating and measuring Coriolis forces. In a vibratory-type rate gyroscope, for example, a drive system including one or more proof masses can be configured to oscillate back and forth relative to a motor pickoff comb in a drive plane orthogonal to the input axis, or "rate axis," in which motion is to be determined. The proof masses may each include a number of interdigitated comb fingers configured to move relative to each other when electrostatically charged with a time-varying signal from a drive voltage source. A number of suspension springs or other flexural elements are typically used to constrain motion of each proof mass in a particular direction above an underlying support substrate.

A sense electrode or other sensing means disposed on the substrate adjacent to and parallel with each proof mass can be charged with a sense bias voltage. As each proof mass moves back and forth above the substrate, the Coriolis force resulting from conservation of momentum of the moving body as it rotates about the input axis causes the spacing between each proof mass and sense electrode to vary, resulting in a concomitant change in capacitance. By measuring the capacitance between the proof mass and sense electrodes in this manner, a measure of the rotational motion and/or acceleration of the moving body can be ascertained.

A significant source of errors in many MEMS-type gyroscopes is due to quadrature motion (i.e. motion out-of-plane) of the proof mass as it oscillates back and forth above the sense electrode. Such quadrature may result, for example, from imperfections in the profile of the comb fingers and suspension springs used in the drive system, and from other imperfections created during the manufacturing process. When present, such quadrature motion produces a large sense signal, affecting the ability of the gyroscope to accurately discern subtle variations in the rate signal. Such quadrature can also interfere with the drive electronics used to drive the proof masses, in some cases requiring additional error-correction circuitry. As a result of these irregularities in the drive system, the output sense signal may contain both the desired rate signal as well as an undesired quadrature signal, diminishing the ability of the gyroscope to effectively measure the rate motion.

In some cases, the temperature within the environment surrounding the gyroscope may also affect the ability of the gyroscope to sense subtle variations in the rate signal. Generally speaking, as the temperature of the gyroscope increases, it becomes more difficult to drive the proof masses, thus increasing the magnitude of the voltage required to drive the proof masses. In some designs, the presence of heat may cause the proof masses to rise or lift above the substrate surface in the direction of the sense axis, introducing an undesired thermal component into the sense signal.

To compensate for quadrature, vibration, and other irregularities in the drive system, many prior-art designs have focused on methods and techniques for suppressing the undesired quadrature signal using complicated error-correction techniques in the drive system and/or sensing circuitry. In certain prior-art designs, for example, a frequency translation circuit is employed to suppress components of the drive signal to the sensor output signal at a predetermined frequency range so that the drive signal can be disassociated with the sense signal using conventional filtering techniques. In other prior-art designs, quadrature error is reduced via a synchronous demodulation process, wherein the desired rate signal is maintained 90° out-of-phase with the quadrature signal. While such methods have been employed to compensate for the undesired quadrature signal, such techniques do not eliminate the undesired quadrature motion in the drive system. As such, many prior-art gyroscopes are unable to accurately detect and measure subtle changes in motion effectively.

SUMMARY

The present invention pertains to the reduction of quadrature in MEMS-type gyroscopic devices using quad steering voltages. A MEMS-type gyroscope in accordance with an illustrative embodiment of the present invention can include one or more proof masses configured to oscillate in a drive plane above a support substrate. A sense electrode positioned adjacent to and parallel with each of the one or more proof masses can be utilized to sense motion of the proof mass in a direction substantially orthogonal to the drive plane. In certain embodiments, for example, a sense bias voltage applied to either the sense electrode or proof mass can be used to produce a charge that can be used to measure Coriolis forces exerted on the proof mass caused by motion of the gyroscope about the input axis. The resultant charge induced between the proof mass and sense electrode can then be fed to a charge amplifier that can be configured to output a rate signal indicative of the velocity and/or acceleration of the moving body.

The proof masses can be anchored to the underlying support substrate using one or more suspension springs or other flexural elements that act to confine the proof masses to motion in the drive plane. In certain embodiments, the suspension springs can be used to hard-ground the proof masses to the support substrate to prevent any imbalance currents in the drive system from flowing into the output of the charge amplifier. In other embodiments, the suspension springs can be used as to electrically connect each of the proof masses to the input of the charge amplifier.

To reduce undesired motion in the drive system, one or more quad steering voltage members positioned adjacent to each of the one or more proof masses can be selectively charged to electrostatically attract the proof mass towards the sense electrode when quadrature occurs. In certain embodiments, for example, a single quad steering voltage member positioned adjacent to each proof mass can be used to electrostatically reduce quadrature motion of the proof mass away from the sense electrode. In other embodiments, multiple quad steering members can be employed to electrostatically reduce quadrature motion of the proof masses. The voltage applied to each of the quad steering voltage members may comprise either a DC voltage or a time-varying voltage. In some embodiments, for example, the voltage may include an AC signal derived from the same signal used to drive the proof masses, but stepped down in voltage using a potentiometer or other resistive element. The voltage applied to the quad steering voltage members can be in phase with the proof mass motion to reduce lift effects caused, for example, from heat within the surrounding environment.

In some embodiments, a levitation force produced by the voltage differential between the sense electrode and the interdigitated comb fingers as well as the quad steering voltage applied to the quad steering voltage members can be further used to reduce quadrature motion of the proof masses, if desired. To reduce the injection of the quad steering voltages into the sense system, the polarity of the voltages applied to each respective sense electrode or proof mass can be reversed. In some embodiments, the magnitude of the voltages applied to each sense electrode or proof mass can also be made asymmetric to compensate for contact potentials and other irregularities in the drive system.

In some embodiments, the quad steering voltage members can be configured to provide a variable amount of quadrature steering depending on the location of the proof mass above the support substrate. In certain embodiments, for example, each of the one or more quad steering voltage members can include a number of inwardly projecting fingers configured to provide a greater amount of electrostatic force as the proof mass is moved further away from center. In another illustrative embodiment, each of the one or more quad steering voltage members can include an inwardly projecting finger positioned within a cutout portion of the sense electrode to vary the electrostatic force as the proof mass is moved further away from center.

In yet another illustrative embodiment, an array of quad steering voltage members positioned adjacent one or both ends of the sense electrode can be configured to provide a greater or lesser amount of electrostatic force as the proof mass is moved further away from center by providing different quad steering voltages to some of the quad steering voltage members, or by selectively actuating each quad steering voltage member at various times during the actuation cycle.

BRIEF DESCRIPTION OF THE DRAWINGS

FIG. 9 is a schematic view of an alternative system for reducing quadrature in the drive system using quad steering voltage members each equipped with a number of inwardly projecting fingers;

FIG. 10 is a schematic view of another alternative system for reducing quadrature in the drive system using quad steering voltage members each equipped with a single inwardly projecting finger;

FIG. 11 is a schematic view of another alternative system for reducing quadrature in the drive system using an array of quad steering voltage members;

FIG. 12 is a schematic view of another alternative system for reducing quadrature in the drive system using a number of quad steering voltage electrode pads;

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
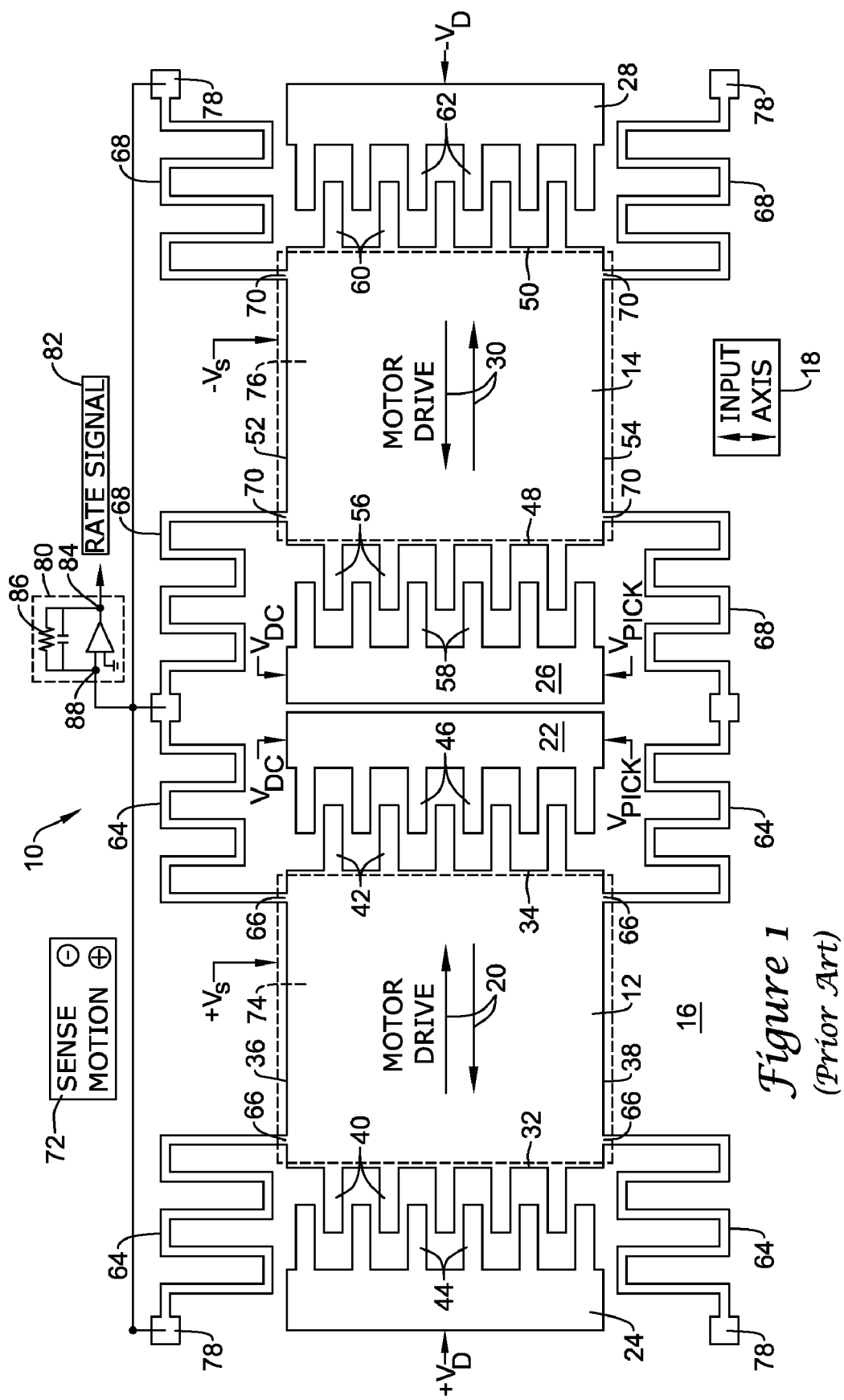
FIG. 1 is a schematic view of a prior art MEMS-type gyroscope.

Referring now to FIG. 1, a schematic view of a prior-art MEMS-type gyroscope 10 will now be described. Gyroscope 10, illustratively a vibratory rate gyroscope, includes a first proof mass 12 and second proof mass 14, each of which are adapted to oscillate back and forth above an underlying support substrate 16 in a drive plane orthogonal to an input axis 18 of the gyroscope in which inertial motion is to be determined. As indicated generally by the right/left set of arrows 20, the first proof mass 12 can be configured to oscillate back and forth above the support substrate 16 between a first motor pickoff comb 22 and first drive electrode 24, both of which remain stationary above the support substrate 16 to limit movement of the first proof mass 12. The second proof mass 14, in turn, can be configured to oscillate back and forth above the support substrate 16 in a similar manner between a second motor pickoff comb 26 and second drive electrode 28, but 180° degrees out-of-phase with the first proof mass 12, as indicated generally by the left/right set of arrows 30.

The first proof mass 12 can include a thin plate or other suitable structure having a first end 32, a second end 34, a first side 36, and a second side 38. Extending outwardly from each end 32,34 of the first proof mass 12 are a number of comb fingers 40,42 used to electrostatically drive the first proof mass 12 in the direction indicated by the right/left set of arrows 20. In the illustrative gyroscope 10 depicted in FIG. 1, for example, a first set of comb fingers 40 extending outwardly from the first end 32 of the first proof mass 12 can be interdigitated with a corresponding set of comb drive fingers 44 formed on the first drive electrode 24. A second set of comb fingers 42 extending outwardly from the second end 34 of the first proof mass 12, in turn, can be interdigitated with a corresponding set of comb fingers 46 formed on the first motor pickoff comb 22.

The second proof mass 14 can be configured similar to the first proof mass 12, having a first end 48, a second end 50, a first side 52, and a second side 54. A first set of comb fingers 56 extending outwardly from the first end 48 of the second proof mass 16 can be interdigitated with a corresponding set of comb fingers 58 formed on the second motor pickoff comb 26. A second set of comb fingers 60 extending outwardly from the second end 50 of the second proof mass 14, in turn, can be interdigitated with a corresponding set of comb fingers 62 formed on the second drive electrode 28.

The first and second proof masses 12,14 can be constrained in one or more directions above the underlying support structure 16 using one or more suspension springs. As shown in FIG. 1, for example, the first proof mass 12 can be anchored or otherwise coupled to the support substrate 16 using a first set of four suspension springs 64, which can be connected at each end 66 to the four corners of the first proof mass 12. In similar fashion, the second proof mass 14 can be anchored to the underlying support substrate 16 using a second set of four springs 68, which can be connected at each end 70 to the four corners of the second proof mass 14. In use, the suspension springs 64,68 can be configured to isolate oscillatory movement of the first and second proof masses 12,14 to the direction indicated generally by the right/left set of arrows 20,30 to reduce undesired perpendicular motion in the direction of the input axis 18, and to reduce quadrature motion in the direction of the sensing motion 72. In addition to supporting the proof masses 12,14 above the support substrate 16, the suspension springs 64,68 can also be configured to provide a restorative force when the drive voltage signal passes through the zero point during each actuation cycle.

A drive voltage $V_D$ can be applied to the first and second drive electrodes 24,28, producing an electrostatic force between the interdigitated comb fingers that causes the comb fingers to electrostatically move with respect to each other. The drive voltage $V_D$ can be configured to output a time-varying voltage signal to alternate the charge delivered to the comb fingers, which in conjunction with the suspension springs 64,68, causes the first and second proof masses 12,14 to oscillate back and forth in a particular manner above the support substrate 16. Typically, the drive voltage $V_D$ will have a frequency that corresponds with the resonant frequency of the first and second proof masses 12,14, although other desired drive frequencies can be employed, if desired.

A pair of sense electrodes 74,76 can be provided as part of the sensing system to detect and measure the out-of-plane deflection of the first and second proof masses 12,14 in the sense motion direction 72 as a result of gyroscopic movement about the input axis 18. As shown by the dashed lines in FIG. 1, the sense electrodes 74,76 can include a thin, rectangular-shaped electrode plate positioned underneath the proof masses 12,14 and oriented in a manner such that an upper face of each sense electrode 74,76 is positioned vertically adjacent to and parallel with the underside of the respective proof mass 12,14. The sense electrodes 74,76 can be configured in size and shape to minimize electrical interference with the surrounding comb fingers 40,42,56,60 to prevent leakage of the drive voltage source $V_D$ into the sense signal.

A sense bias voltage $V_S$ applied to each of the sense electrodes 74,76 can be utilized to induce a charge on the first and second proof masses 12,14 proportional to the capacitance between the respective sense electrode 74,76 and proof mass 12,14. The sense electrode 74,76 can be formed from a suitable material such as silicon that is electrically conductive with the material used to form the first and second proof masses 12,14 (e.g. a silicon-doped conductor), allowing the charge produced on the sense electrode 74,76 vis-à-vis the sense bias voltage $V_S$ to be transmitted to the proof mass 12,14.

During operation, the Coriolis force resulting from rotational motion of the gyroscope 10 about the input axis 18 causes the first and second proof masses 12,14 to move out-of-plane with respect to the sense electrodes 74,76. When this occurs, the change in spacing between the each respective sense electrode 74,76 and proof mass 12,14 induces a change in the capacitance between the sense electrode 74,76 and proof mass 12,14, which can be measured as a charge on the proof masses 12,14 using the formula:

$$q=\epsilon_0 A V_S/D$$

wherein A is the overlapping area of the sense electrode and proof mass, $V_S$ is the sense bias voltage applied to the sense electrode, $\epsilon_0$ is the dielectric constant, and D is the distance or spacing between the sense electrode 74,76 and respective proof mass 12,14. The resultant charge received on the proof mass 12,14 is then fed through the various suspension springs 64,68 to a number of leads 78. The leads 78, in turn, can be electrically connected to a charge amplifier 80 that converts the charge signals, or currents, received from the first and second proof masses 12,14 into a corresponding rate signal 82 that is indicative of the Coriolis force.

To help balance the input to the charge amplifier 80 at or about zero, the sense bias voltage $V_S$ applied to the first proof mass 12 can have a polarity opposite that of the sense bias voltage $V_S$ applied to the second proof mass 14. In certain designs, for example, a sense bias voltage $V_S$ of +5V and −5V, respectively, can be applied to each of the sense electrodes 74,76 to prevent an imbalance current from flowing into the output node 84 of the charge amplifier 80. To maintain the charge induced on the proof masses 12,14 at virtual ground, a relatively large value resistor 86 can be connected across the input 88 and output nodes 86 of the charge amplifier 80, if desired.

A motor bias voltage $V_{DC}$ can be provided across the first and second motor pickoff combs 22,26 to detect and/or measure displacement of the proof masses 12,14 induced via the drive voltage source $V_D$. A motor pickoff voltage $V_{PICK}$ resulting from movement of the comb fingers 42,56 on the first and second proof masses 12,14 relative to the comb fingers 46,58 on the first and second motor pickoff combs 22,26 can be used to detect motion of the first and second proof masses 12,14.

During actuation of the gyroscope 10, imperfections in the drive and suspension system can produce quadrature, or motion that is out of plane and in phase with the motor motion, in the first and second proof masses 12,14. Such quadrature may result, for example, from non-uniformities in the profile of the comb fingers used to electrostatically actuate the first and second proof masses 12,14, and from non-ideal suspension springs used to constrain movement of the proof masses 12,14 above the support substrate 16. Other imperfections produced during the fabrication of the gyroscope 10 can also lead to quadrature of the proof masses 12,14, affecting the sensitivity of the sensing system. In certain cases, the undesired quadrature signal may be greater than the desired rate signal, reducing the ability of the sensing system to accurately detect and measure small changes in gyroscopic motion.

In some cases, fluctuations of the temperature within the environment surrounding the gyroscope may also affect the ability of the gyroscope to accurately sense rate. Mismatches in the amplitude of the drive voltage $V_D$ signals, the drive capacitance between the drive electrodes 24,28 and the proof masses 12,14, the motor pickoff capacitance between the motor pickoff combs 22,26 and the proof masses 12,14, as well as mismatches in the electrical properties of the motor pickoff bias voltage $V_{DC}$ signal applied to the motor pickoff combs 22,26 may also affect the ability of the gyroscope to accurately sense rate. Typically, the temperature-induced quadrature motion of the proof masses 12,14 is in phase with the drive motion of the proof masses 12,14, and out-of-phase with the sense motion.

To reduce the effects of this quadrature, many prior-art gyroscopes attempt to compensate for the undesired quadrature signal by varying the motor bias voltage $V_{DC}$ applied to the comb drive fingers, or by employing filtering techniques to filter the undesired quadrature signal from the desired rate signal. In certain prior-art designs, for example, a frequency translation circuit is employed to suppress components of the drive signal at a predetermined frequency so that the drive signal can be disassociated with the sense signal using conventional filtering techniques. Other techniques employing complex error-correction methods have also been used to compensate for the quadrature signal, increasing the cost and complexity of the drive and sensing electronics. While such techniques can be used to segregate the quadrature signal from the rate signal, such techniques do not eliminate the underlying quadrature motion in the drive system. As such, many gyroscope devices are limited in their ability to detect and/or measure small changes in motion.

Figure 2:
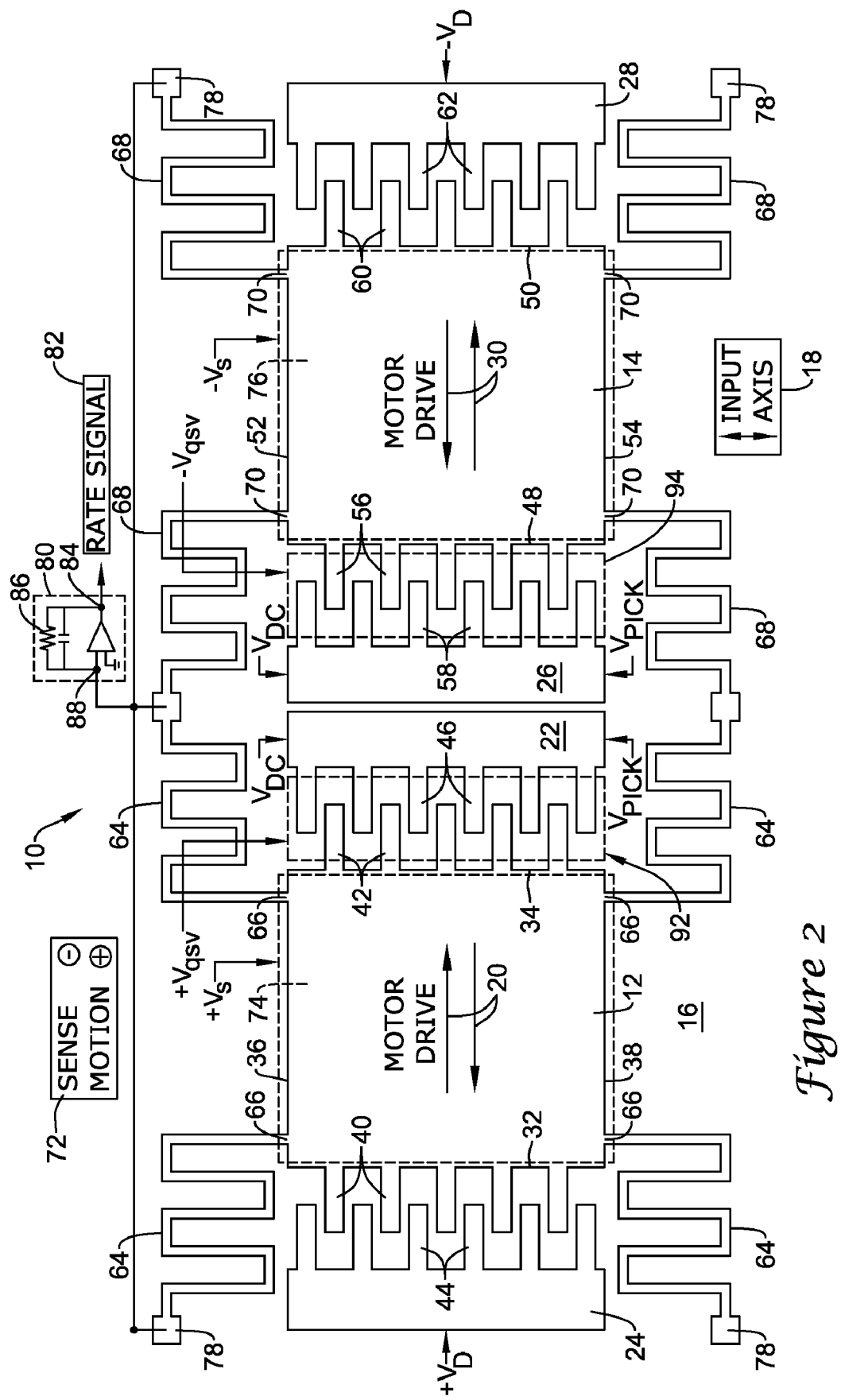
FIG. 2 is a schematic view of an illustrative MEMS-type gyroscope utilizing quad steering voltages to reduce quadrature motion.

Turning now to FIG. 2, a schematic view of a MEMS-type gyroscope 90 in accordance with an illustrative embodiment of the present invention utilizing quad steering voltages to reduce quadrature will now be described. Gyroscope 90 can be configured similar to that described above with respect to FIG. 1, with like elements in each figure numbered in like fashion. In the illustrative embodiment of FIG. 2, however, gyroscope 90 may further include one or more quad steering voltage (QSV) members that can be used to electrostatically compensate for quadrature in the drive system, thereby preventing the introduction of a quadrature signal into the sensing system.

The quad steering voltage members can be located adjacent one or both ends and/or sides of the first and second proof masses 12,14. In the illustrative embodiment of FIG. 2, for example, a first quad steering voltage member 92 positioned adjacent the second end 34 of the first proof mass 12 can be configured to reduce quadrature motion of the first proof mass 12 in the sense motion direction 72 (i.e. orthogonal to the drive plane). In similar fashion, a second quad steering voltage member 94 positioned adjacent the first end 48 of the second proof mass 14 can also be configured to reduce quadrature motion of the second proof mass 14 in the sense motion direction 72.

As indicated by dashed lines in FIG. 2, each quad steering voltage member 92,94 can include a thin, rectangular-shaped electrode plate positioned underneath the comb fingers used to sense the motion of the first and second proof masses 12,14 relative to the first and second motor pickoff combs 22,26. As with the sense electrodes 74,76, the quad steering voltage members 92,94 can be oriented in a manner such that an upper face of each quad steering voltage member 92,94 is positioned vertically adjacent to and parallel with the underside of the comb fingers.

As can be further seen in FIG. 2, a quad steering voltage $V_{QSV}$ can be applied to each of the quad steering voltage members 92,94. To help prevent the quad steering voltages $V_{QSV}$ from being injected into the sense signal, the polarity of the quad steering voltages $V_{QSV}$ applied to each quad steering voltage member 92,94 can be reversed, negating the net quad steering voltages $V_{QSV}$ at the input node 88 of the charge amplifier 80. The quad steering voltages $V_{QSV}$ applied to each quad steering voltage member 92,94 can be of the same magnitude but of opposite polarity from each other, or, alternatively, can differ in both magnitude and polarity to permit differing quad steering voltages to be applied to each proof mass 12,14, if desired.

Figure 3:
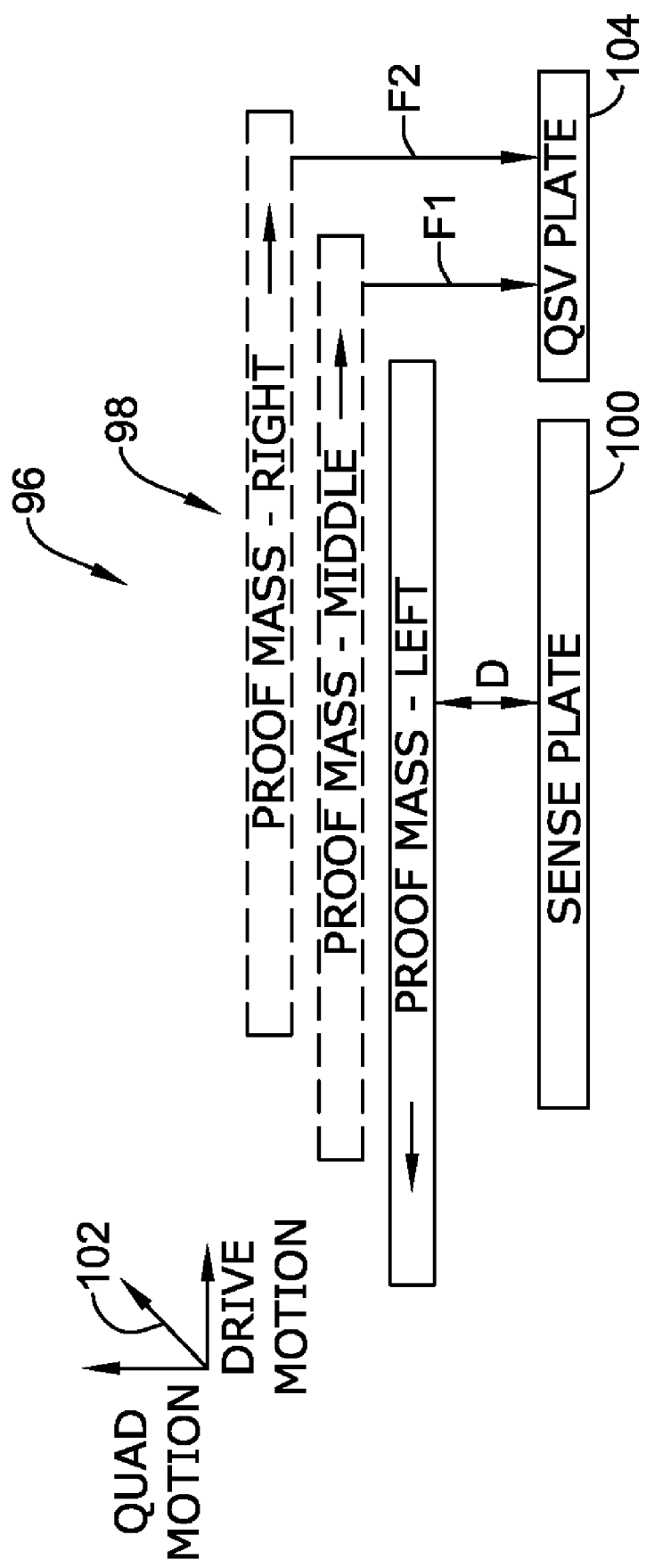
FIG. 3 is a diagrammatic view showing an illustrative method of eliminating quadrature motion in the drive system using a single quad steering voltage member.

FIG. 3 is a diagrammatic view showing an illustrative method 96 of reducing quadrature motion in the drive system using a single quad steering voltage member. As shown in FIG. 3, a gyroscope similar to that described above with respect to FIG. 2 can include a proof mass 98 configured to oscillate back and forth above an underlying sense electrode 100. Ideally, the proof mass 98 oscillates in a manner substantially parallel to the sense electrode 100 such that the nominal distance D between the oscillating proof mass 98 and sense electrode 100 varies only in response to changes in Coriolis force exerted by the moving body. As indicated generally by reference number 102, however, imperfections in the drive system can also cause the oscillating proof mass 98 to move in a direction away from the sense electrode 100. Since the sense signal is dependent on the distance D between the proof mass 98 and sense electrode 100, any changes in distance D resulting from quadrature motion 102 of the proof mass 98 motion will be injected into the sensing signal, reducing the ability of the gyroscope to accurately sense small changes in Coriolis force.

To counterbalance this quadrature motion, a quad steering voltage member 104 may be positioned laterally adjacent to and parallel with the sense electrode 100. In the illustrative embodiment, the quad steering voltage member 104 can be used to electrostatically attract the proof mass 98 downwardly towards the sense electrode 100 when quadrature motion 102 is detected in the drive system. As illustrated in FIG. 3, for example, movement of the proof mass 98 from an initial (i.e. left) position towards a middle position results in undesired quadrature motion of the proof mass 98 in a direction orthogonal to the drive axis. To counter this motion, a first quad steering voltage can be applied to the quad steering voltage member 104, inducing an electrostatic attractive force between the proof mass 98 and quad steering voltage member 104, as indicated generally by arrow $F_1$. As the proof mass 98 moves further to a second (i.e. right) position during the actuation cycle, the electrostatic attractive force may increase due to the increased overlap between the proof mass and the quad steering voltage member 104, as indicated generally by the larger arrow $F_2$.

To effectively counteract the quadrature motion 102 of the proof mass 98, the quad steering voltage applied to the quad steering voltage member 104 should be made sufficient to counterbalance only the change in distance D caused by the quadrature motion 102. In certain embodiments, for example, the electrostatic attraction force produced by the quad steering voltage member 104 should equal or be similar to the quad motion force on the proof mass 98, allowing only the Coriolis force component measured by the sense electrode 100 to be sensed. While it is desirable in certain applications to counteract the quadrature motion 102 in this manner, it should be understood that the quad steering voltage member 104 can be configured to compensate for the quadrature motion 102 in other desired ways.

Figure 4:
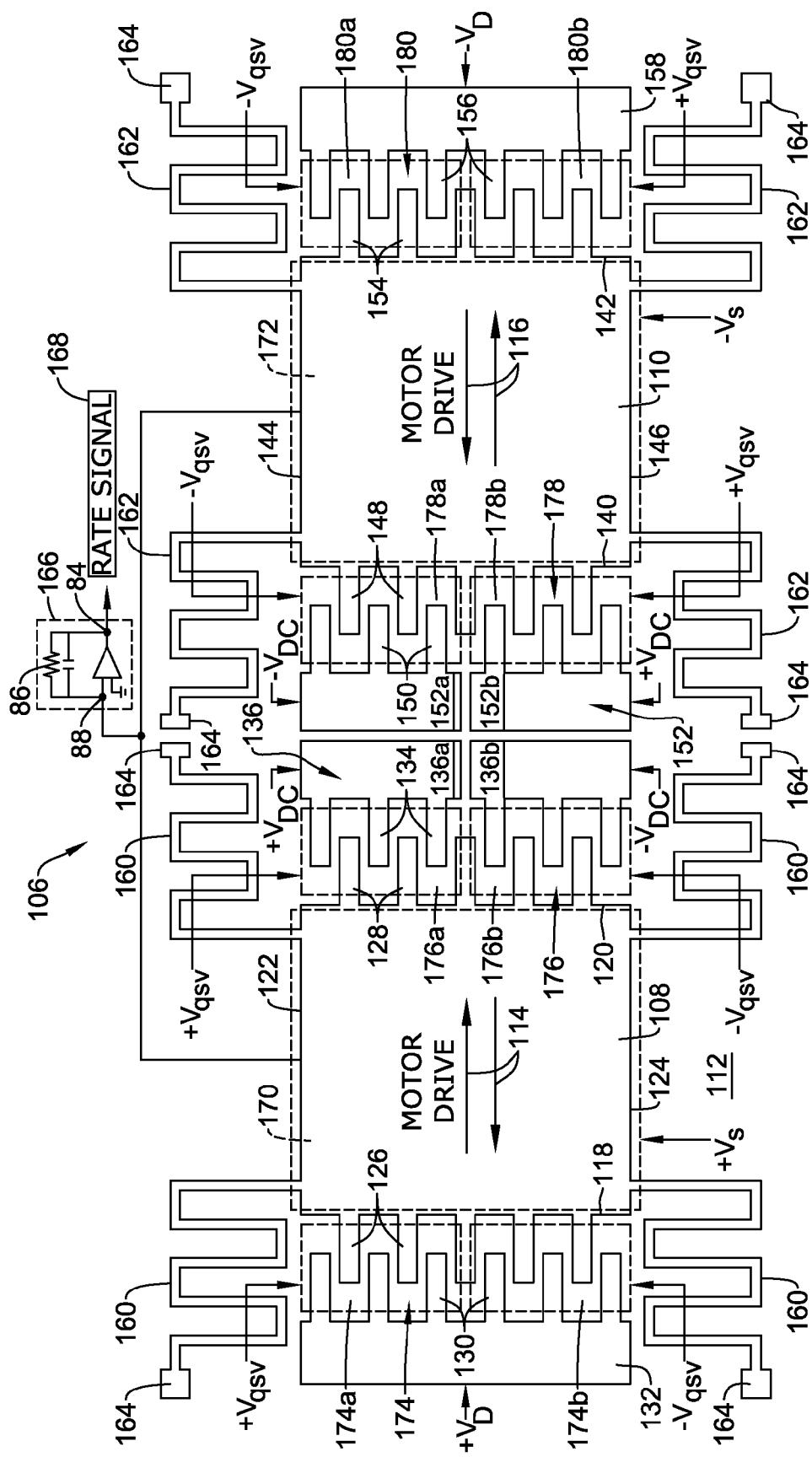
FIG. 4 is a schematic view of a MEMS-type gyroscope utilizing multiple quad steering voltage members to reduce quadrature motion in the drive system.

FIG. 4 is a schematic view of a MEMS-type gyroscope 106 in accordance with another illustrative embodiment of the present invention utilizing multiple quad steering voltage members to reduce quadrature motion in the drive system. Gyroscope 106, illustratively a vibratory rate gyroscope, includes a first proof mass 108 and second proof mass 110, each of which are adapted to oscillate back and forth above an underlying support substrate 112 in opposition to each other, as indicated generally by the right/left set of arrows 114,116.

The first proof mass 108 can include a thin plate or other suitable structure having a first end 118, a second end 120, a first side 122, and a second side 124. Extending outwardly from each end 118,120 of the first proof mass 108 are a number of comb fingers 126,128 that can be used to electrostatically drive the first proof mass 108 in the direction indicated by the right/left set of arrows 114. In the illustrative gyroscope 106 depicted in FIG. 4, for example, a first set of comb fingers 126 extending outwardly from the first end 118 of the first proof mass 108 can be interdigitated with a corresponding set of comb fingers 130 formed on a first drive electrode 132. The comb fingers 128 extending outwardly from the second end 120 of the first proof mass 108, in turn, can be interdigitated with a corresponding set of comb fingers 134 formed on a first motor pickoff comb 136.

The second proof mass 110 can be configure similar to the first proof mass 108, having a first end 140, a second end 142, a first side 144, and a second side 146. A first set of comb fingers 148 extending outwardly from the first end 140 of the second proof mass 110 can be interdigitated with a corresponding set of comb fingers 150 formed on a second motor pickoff comb 152. A second set of comb fingers 154 extending outwardly from the second end 142 of the second proof mass 110, in turn, can be interdigitated with a corresponding set of comb fingers 156 formed on a second drive electrode 158.

The first and second proof masses 108,110 can be constrained in one or more directions above the support substrate 112 using a number of suspension springs 160,162 or other flexural elements, similar in structure to that described above with respect to FIG. 1. In the illustrative embodiment of FIG. 4, however, the suspension springs 160,162 are electrically grounded to the support substrate 112 at a number of grounding junctions 164, and are not electrically connected to the charge amplifier 166. In use, these grounding junctions 164 aid in counteracting vibration sensitivities in the drive system that can cause imbalance currents to leak into the sensing system and affect the rate signal output 168.

A drive voltage $V_D$ can be applied to the first and second drive electrodes 132,158, inducing an electrostatic force between the interdigitated comb fingers that can be used to electrostatically oscillate the proof masses 108,110. As with other embodiments herein, the drive voltage $V_D$ can be configured to output a time-varying voltage signal to alternate the charge delivered to the comb fingers, which in conjunction with the suspension springs 160,162, causes the first and second proof masses 108,110 to oscillate back and forth in a particular manner above the support substrate 112.

A pair of sense electrodes 170,172 can be provided to detect and measure the out-of-plane deflection of the first and second proof masses 108,110 in response to movement of the gyroscope 106 about the input axis. As shown by dashed lines in FIG. 4, the sense electrodes 170,172 can each include a thin, rectangular-shaped plate positioned underneath the proof masses 108,110 and oriented in a manner such that an upper face of each sense electrode 170,172 is positioned vertically adjacent to and parallel with the underside of the respective proof mass 108,110.

A sense bias voltage $V_S$ similar to that described above with respect to FIG. 1 can be utilized to measure variations in capacitance between the sense electrodes 170,172 and proof masses 108,110 indicative of the Coriolis forces exerted by the moving body. In the illustrative embodiment of FIG. 4, the sense bias voltage $V_S$ is applied to each of the sense electrodes 170,172, inducing a charge on the proof masses 108,110 proportional to the capacitance between the respective sense electrode 170,172 and proof mass 108,110. While the sense bias voltage $V_S$ is shown applied to the sense electrodes 170,172 in FIG. 4, it should be understood the sense bias voltage $V_S$ can be applied directly to the proof masses 108,110, producing a charge on the proof masses 108,110 that can be transferred through the sense electrodes 170,172 and then fed to the input of the charge amplifier 166, which, in contrast to that shown in FIG. 4, can be coupled to the sense electrodes 170,172.

To detect and measure movement of the proof masses 108,110, a motor sense bias voltage $V_{DC}$ signal can be applied to each of the first and second motor pickoff combs 136,152. In certain embodiments, the first and second motor pickoff combs 136,152 can each be split, forming two separate motor pickoff combs 136a,136b,152a,152b, each being electrically isolated from each other. To help prevent the motor sense bias voltage $V_{DC}$ from being injected into the sensing system, the polarity of the voltage applied to each respective motor pickoff comb 136a,136b,152a,152b half can be reversed or offset in some desired manner. As shown in FIG. 4, for example, a positive motor sense bias voltage $+V_{DC}$ signal could be applied to the upper split motor pickoff comb 136a whereas a negative motor sense bias $-V_{DC}$ signal could be applied to the lower split motor pickoff comb 136b. By reversing the polarity to each motor pickoff comb 136,152 in this manner, a net zero charge may be provided on the comb fingers 148 that prevents the motor sense bias voltage $V_{DC}$ signal from leaking into the sensing system.

To balance the input to the charge amplifier 166 at or about zero, the sense bias voltage $V_S$ applied to sense electrode 170 can have a polarity opposite that of the sense bias voltage $V_S$ applied to sense electrode 172. In certain embodiments, for example, a sense bias voltage $V_S$ of +5V and −5V can be applied, respectively, to the sense electrodes 170 1,72 to prevent an imbalance current from flowing into the output of the charge amplifier 166. In some cases, the contact potentials at the sense electrodes 108,110 may vary due to irregularities in the fabrication process, resulting in offset errors in the drive system. To compensate for these variations, the magnitude of the sense bias voltage $V_S$ can be varied (e.g. 4.8V and 5.2 V) to null the net sense bias voltage $V_S$ at the input of the charge amplifier 166, if desired.

As can be further seen in FIG. 4, gyroscope 106 may further include a number of quad steering voltage members configured to reduce quadrature motion in the drive system. In the illustrative embodiment of FIG. 4, each of the first and second proof masses 108,110 are shown equipped with multiple quad steering voltage members that can be used to reduce quadrature in more than one direction, if desired. With respect to the first proof mass 108, for example, a first quad steering voltage member 174 positioned laterally adjacent to the first end 118 of the first proof mass 108 can be configured to reduce quadrature motion of the first proof mass 108 as it moves in a direction from right to left during the first half of the actuation cycle. In some embodiments, a second quad steering voltage member 176 positioned laterally adjacent the second end 120 of the first proof mass 110 can be configured to reduce quadrature motion of the first proof mass 108 as it moves in a direction from left to right during the second half of the actuation cycle. In some cases, either the first quad steering voltage member 174 or the second quad steering voltage member 176 will be used, but not both, depending on the quadrature motion that occurs in the particular device. However, in other cases, both the first quad steering voltage member 174 and the second quad steering voltage member 176 may be used. A similar set of quad steering voltage members 178,180 disposed laterally adjacent to the ends 140,142 of the second proof mass 110 can be configured to prevent quadrature motion of the second proof mass 110 during each stage of the actuation cycle.

To further reduce the introduction of the quad steering voltages $V_{QSV}$ into the sense signal, each of the quad steering voltage members 174,176,178,180 may be split into separate quad steering voltage members, labeled in FIG. 4 as 174a, 174b, 176a, 176b, 178a, 178b, and 180a, 180b, respectively. As with the motor pickoff combs 136,152, each of the split quad steering voltage members 174a, 174b, 176a, 176b, 178a, 178b, 180a, 180b can be electrically isolated from each other, with the polarity of the quad steering voltage $V_{QSV}$ being applied to each respective half of the quad steering voltage member being reversed.

The polarity of the quad steering voltages $V_{QSV}$ applied to each side of the proof mass 108,110 can also be reversed to further null the net quad steering voltage $V_{QSV}$ signal. With respect to the first proof mass 108, for example, a positive quad steering voltage $+V_{QSV}$ could be applied to the upper-left quad steering voltage member 174a whereas a negative quad steering voltage $-V_{QSV}$ could be applied to the upper-right quad steering voltage member 176a. As with other embodiments herein, the magnitude of the quad steering voltages $V_{QSV}$ applied to each of the quad steering voltage members 174,176,178,180 could be made equal to each other, or offset by some desired amount.

Figure 5:
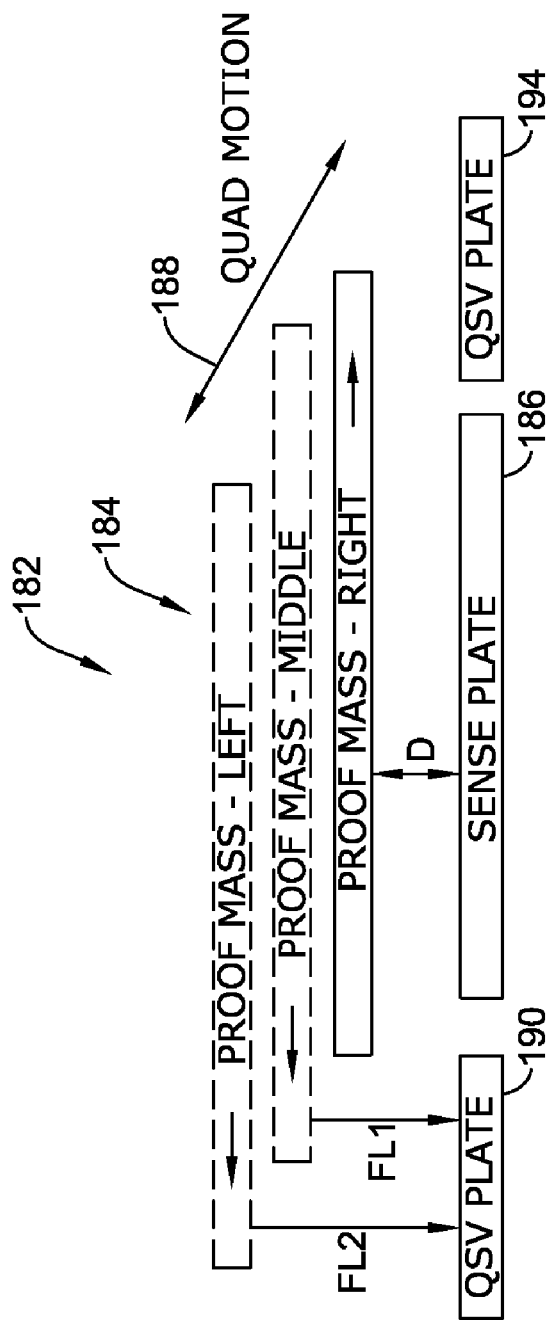
FIG. 5 is a diagrammatic view showing an illustrative method of eliminating quadrature motion in the drive system using multiple quad steering voltage members.

FIG. 5 is a diagrammatic view showing an illustrative method 182 of reducing quadrature motion in the drive system using multiple quad steering voltage members. As shown in FIG. 5, a gyroscope similar to that described above with respect to FIG. 4 can include a proof mass 184 configured to oscillate back and forth at a nominal distance D above an underlying sense electrode 186. In the particular view illustrated in FIG. 5, the proof mass 184 is shown moving from an initial (i.e. right) position to a middle position and then to a left position above the sense electrode 186. As indicated generally by reference number 188, a quadrature motion component of the proof mass 184 can cause the proof mass 184 to move in a direction away from the sense electrode 186, introducing a quadrature signal component into the sense signal.

To counterbalance this quadrature motion 188, a first quad steering voltage member 190 positioned laterally adjacent to and parallel with the left side of the sense electrode 186 can be used to electrostatically attract the proof mass 184 downwardly towards the underlying sense electrode 186 when quadrature motion 188 occurs in the drive system. The magnitude of the quad steering voltage applied to the first quad steering voltage member 190 can be set depending on the amount of quadrature motion 188 detected.

As indicated generally by arrows $F_{L1}$ and $F_{L2}$, as the proof mass 184 moves further to the left, the electrostatic attractive force may increase due to the increased overlap between the proof mass 184 and the quad steering voltage member 190, as indicated generally by the larger arrow $F_2$. In certain embodiments, the electrostatic attraction force produced by the quad steering voltage member 190 should equal or be similar to the quadrature motion force on the proof mass 98, allowing only the Coriolis force component measured by the sense electrode 186 to be sensed. While it is desirable in certain applications to counteract the quadrature motion 188 in this manner, it should be understood that the quad steering voltage member 190 can be configured to compensate for the quadrature motion 188 in other desired ways. In some cases, the magnitude of the quad steering voltage may be varied at different times during the actuation cycle as the proof mass 192 moves away from the sense electrode 186 from right to left, inducing variable electrostatic forces between the quad steering voltage member 190 and proof mass 184. In any event, the electrostatic attraction forces $F_{L1}, F_{L2}$ produced by the first quad steering voltage member 190 can be made sufficient to counterbalance the change in distance D caused by the quadrature motion 180 component of the proof mass 184, allowing the sense system to accurately detect and measure Coriolis forces produced by the moving body.

Figure 6:
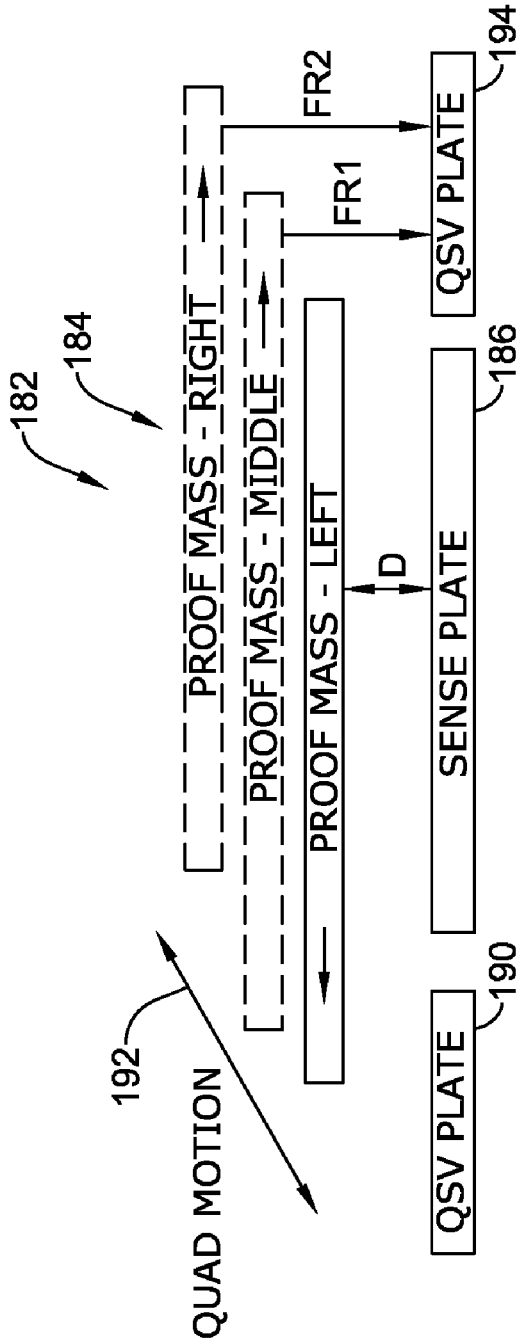
FIG. 6 is another diagrammatic view showing the illustrative method of FIG. 5 at a different stage during the actuation cycle.

FIG. 6 is another diagrammatic view showing the system of FIG. 5 with the quad motion in the opposite direction. The direction of the quad motion for any particular device may depend on a number of factors, including imperfections in the drive and suspension system. As shown in FIG. 6, as the proof mass 184 moves from an initial (i.e. left) position to a middle position and then a right position above the sense electrode 186, a quadrature motion, indicated generally by reference number 192, causes the proof mass 184 to move in a direction away from the sense electrode 186, introducing a quadrature signal component into the sense signal.

To counter this quadrature motion 192, a second quad steering member 194 positioned laterally adjacent and parallel to the right end of the sense electrode 194 can be used to electrostatically attract the proof mass 184 downwardly towards the underlying sense electrode 186. Similar to the left quad steering voltage member 190, the amount of electrostatic charge produced by the second quad steering voltage member 194 can be set based on the amount of quadrature motion 192 detected, as indicated above.

Figure 7:
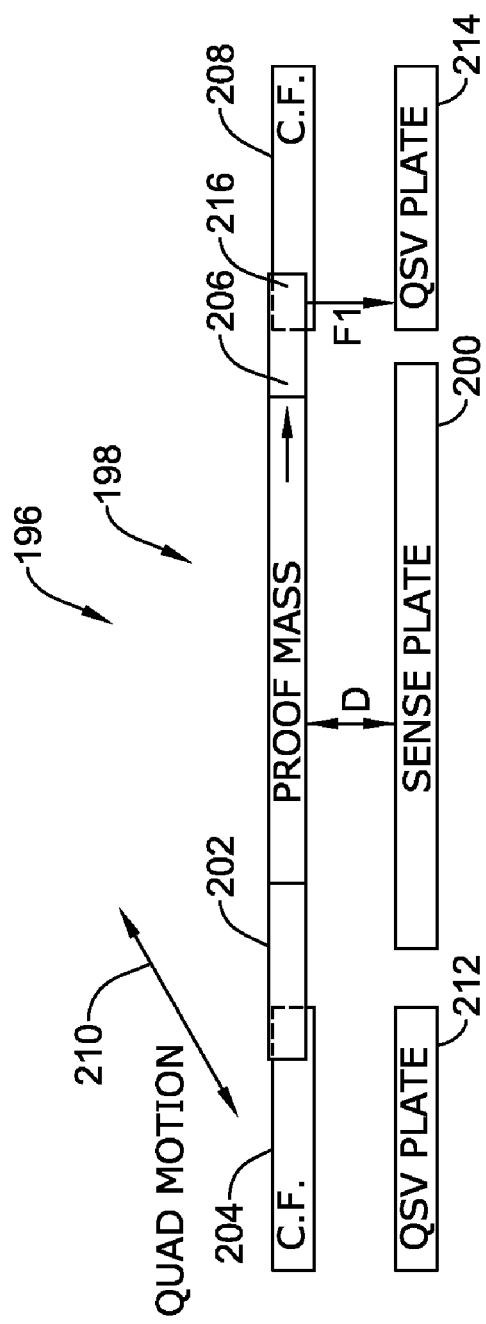
FIG. 7 is a diagrammatic view showing another illustrative method of reducing quadrature motion in the drive system using multiple quad steering voltage members.

FIG. 7 is a diagrammatic view showing another illustrative method 196 of reducing quadrature motion in the drive system using multiple quad steering voltage members. As shown in FIG. 7, a gyroscope similar to that described above with respect to FIG. 4 can include a proof mass 198 configured to oscillate back and forth at a nominal distance D above an underlying sense electrode 200. Similar to the comb fingers 40,42,44,46 of FIG. 4, the proof mass 198 may include a first number of comb fingers 202 interdigitated with a number of drive comb fingers 204 connected to a drive electrode (not shown), and a second number of comb fingers 206 interdigitated with a number of comb fingers 208 connected to a motor pickoff comb (not shown).

In the particular view illustrated in FIG. 7, the proof mass 198 is shown moving from left to right above the sense electrode 200. As indicated generally by reference number 210, a quadrature motion component of the proof mass 198 can cause the proof mass 198 to move in a direction away from the sense electrode 200, introducing a quadrature signal component into the sense signal. A similar but oppositely disposed quadrature motion component caused by movement of the proof mass 198 from right to left above the sense electrode 200 can similarly cause the proof mass 198 to move in a direction away from the sense electrode 200, further introducing a quadrature signal component into the sense signal.

To counterbalance the quadrature motion, a number of quad steering voltage members 212,214 positioned laterally adjacent to and parallel with, respectively, the left and right sides of the sense electrode 200 can be used to electrostatically attract the proof mass 198 downwardly towards the underlying sense electrode 200 when quadrature motion occurs in the drive system. In some embodiments, the quad steering voltage members 212,214 may have a split configuration similar to that described above with respect to FIG. 4, wherein each of the split quad steering voltage members are electrically isolated from each other with the polarity of the quad steering voltage applied to each respective half being reversed.

Figure 8:
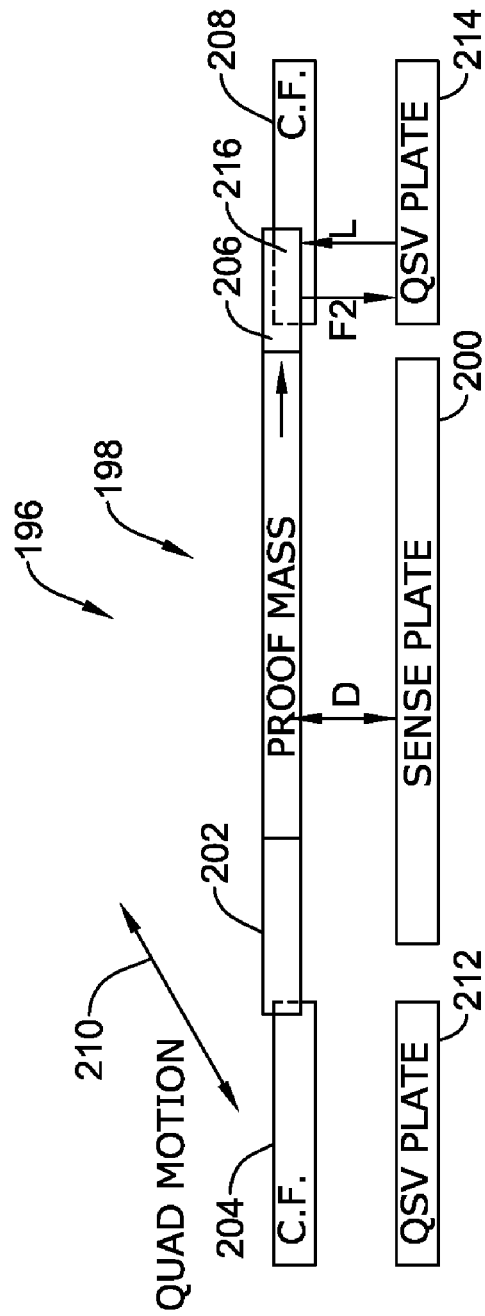
FIG. 8 is another diagrammatic view showing the illustrative method of FIG. 7 at a different stage during the actuation cycle.

As indicated generally by arrow $F_1$, as the proof mass 198 moves from left to right above the sense electrode 200, an electrostatic attractive force is created between the proof mass 198 and the quad steering voltage member 214. As further shown in a second view in FIG. 8, further movement of the proof mass 198 from left to right may cause the electrostatic attractive force $F_2$ to increase due to the increased overlap between the proof mass 198 and the quad steering voltage member 214. As this occurs, the amount of overlap 216 between the proof mass comb fingers 206 and the comb fingers 208 of the motor pickoff comb also increases, in some cases resulting in an increase in voltage between the sense electrode 200 and the motor pickoff comb fingers 208.

In certain embodiments, the increase in voltage between the sense electrode 200 and the motor pickoff comb fingers 208 can be configured to produce a levitation force or lift L on the proof mass 198, causing it to move upwardly away from the sense electrode 200. This upward levitation force, in conjunction with the downward electrostatic actuation forces $F_1, F_2$ produced by the quad steering voltage member 214, can be further utilized to counterbalance the change in distance D caused by quadrature motion of the proof mass 198, allowing the sense system to accurately detect and measure Coriolis forces produced by the moving body. If desired, a similar levitation force can be induced on the proof mass 198 as it moves from left to right during the actuation cycle. As with other embodiments herein, the magnitude of the quad steering voltage applied to the quad steering voltage member 214 can be set depending on the amount of quadrature motion 210 detected.

FIG. 9 is a schematic view of an alternative system 218 for reducing quadrature motion in a MEMS-type gyroscope in accordance with an illustrative embodiment of the present invention. As shown in FIG. 9, system 218 can include a proof mass 220 having a structure similar to that depicted in FIG. 1, with a first set of comb fingers 222 and a second set of comb fingers 224 that can be utilized to electrostatically drive the proof mass 220 back and forth between a drive electrode and motor pickoff comb (not shown). A sense electrode 226 having a shape illustrated generally by dashed lines 228 can be positioned underneath the proof mass 220 and oriented in a manner such that an upper face of the sense electrode 226 is positioned vertically adjacent to and parallel with the underside of the proof mass 220.

A set of quad steering voltage members 230,232 positioned laterally adjacent to and parallel with the sense electrode 226 can be configured to reduce any quadrature motion of the proof mass 220 in a manner similar to that described above with respect to FIGS. 5–6. In the illustrative embodiment of FIG. 9, however, each quad steering voltage member 230,232 can include a number of inwardly projecting fingers 234,236. The inwardly projecting fingers 234, 236 each can have a non-linear shape such that, as the comb fingers 222,224 are moved towards the inwardly projecting fingers 234,236, a non-linear increasing amount of overlap between the comb drive fingers 222,224 and the inwardly projecting fingers 234,236 and/or sense electrode 226 results. Such an arrangement may result in a greater control over the quad steering that occurs as the proof mass 220 is actuated further away from its central position above the support substrate.

FIG. 10 is a schematic view of another alternative system 238 for reducing quadrature motion in a MEMS-type gyroscope. As shown in FIG. 10, system 238 can include a proof mass 240 having a structure similar to that depicted in FIG. 1, with a first set of comb fingers 242 and a second set of comb fingers 244 that can be utilized to electrostatically drive the proof mass 240 back and forth between a drive electrode and motor pickoff comb (not shown). A sense electrode 246 having a shape illustrated generally by dashed lines 248 can be positioned underneath the proof mass 240 and oriented in a manner such that an upper face of the sense electrode 246 is positioned vertically adjacent to and parallel with the underside of the proof mass 240.

A set of quad steering voltage members 250,252 positioned laterally adjacent to and parallel with each end of the sense electrode 246 can be configured to reduce any quadrature motion of the proof mass 240 in a manner similar to that described above with respect to FIG. 9. In the illustrative embodiment of FIG. 10, however, each quad steering voltage member 250,252 includes an inwardly projecting finger 254,256 that extends into a cutout portion 258,260 of the sense electrode 246. In use, the shape of the inwardly projecting fingers 254,256 can be configured to produce a desired amount of overlap between the proof mass 240 and the sense electrode 246 as the proof mass 240 is actuated further away from its central position above the support substrate.

FIG. 11 is a schematic view of another alternative system 262 for reducing quadrature in a MEMS-type gyroscope. As shown in FIG. 11, system 262 can include a proof mass 264 having a structure similar to that depicted in FIG. 1, with a first set of comb fingers 266,268 that can be utilized to electrostatically drive the proof mass 264 back and forth between a drive electrode and motor pickoff comb (not shown). A sense electrode 270 having a shape illustrated generally by dashed lines 272 can be positioned underneath the proof mass 264 and oriented in a manner such that an upper face of the sense electrode 270 is positioned vertically adjacent to and parallel with the underside of the proof mass 264.

During actuation of the proof mass 264 back and forth above the sense electrode 270, a first and/or second array of quad steering voltage members 274,276 may provide an electrostatic force to help remove quadrature motion. Each of the quad steering voltage members 274,276 may have a different quad steering voltage applied thereto to produce a desired (and possibly non-linear) correction force to reduce the quadrature motion of the proof mass. In some cases, the quad steering voltage members 274,276 can be controlled over time, sometimes in a cascading fashion, as the proof mass 264 moves further over more of each individual quad steering voltage member 274,276. By activating the quad steering voltage members 274,276 in this fashion, a variable amount of quad steering can be applied to the proof mass 264 at different stages during the actuation cycle, as desired.

FIG. 12 is a schematic view of another alternative system 278 for reducing quadrature in a MEMS-type gyroscope. As shown in FIG. 12, system 278 can include a proof mass 280 having a structure similar to that depicted in FIG. 1, with a first set of comb fingers 282 and a second set of comb fingers 284 that can be utilized to electrostatically drive the proof mass 280 back and forth between a drive electrode and motor pickoff comb (not shown). A sense electrode 286 having a shape illustrated generally by dashed lines 288 can be positioned underneath the proof mass 280 and oriented in a manner such that an upper face of the sense electrode 286 is positioned vertically adjacent to and parallel with the underside of the proof mass 280.

To counter quadrature motion as the proof mass 280 oscillates back and forth above the sense electrode 286, system 278 can include a number of quad steering electrode pads 290 formed within a number of corresponding cutouts 292 disposed within the interior of the sense electrode 286. An electrical lead 294 coupling each electrode pad 290 to a quad steering voltage $V_{QSV}$ can be used to electrostatically reduce any quadrature motion of the proof mass 280. To prevent the injection of the quad steering voltages $V_{QSV}$ into the sense signal, the polarity of the quad steering voltage $V_{QSV}$ applied to each adjacent electrode pad 290 can be reversed.

Figure 13:
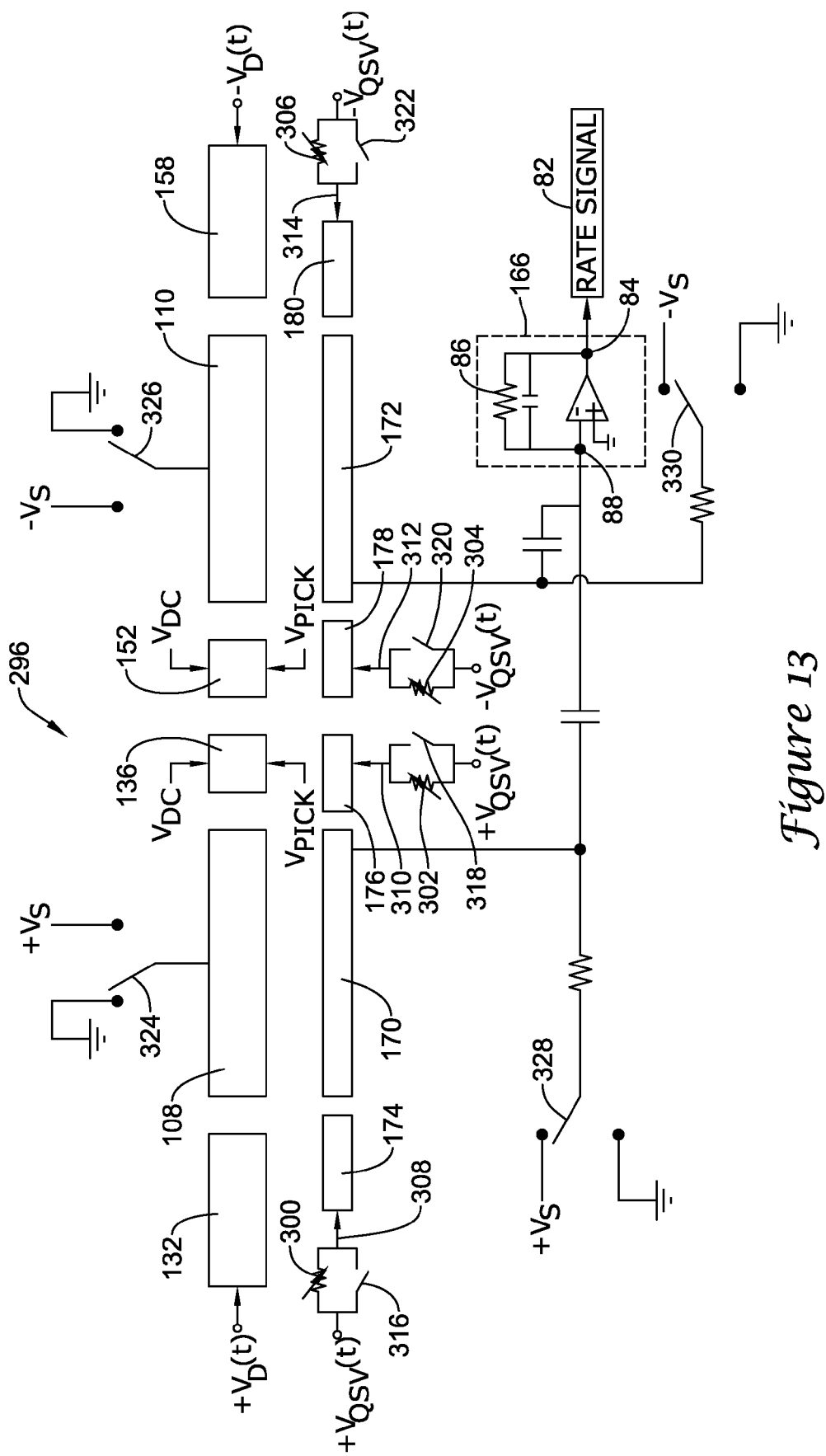
FIG. 13 is a schematic view showing an illustrative system for reducing quadrature motion using AC quad steering voltages.

Referring now to FIG. 13, a schematic view of an illustrative system 296 for reducing quadrature motion using AC quad steering voltages will now be described. System 296 can be configured similar to that described above with respect to FIG. 4, with like elements described in like fashion in the drawings. In the illustrative system 296 of FIG. 13, however, the quad steering voltage source used to energize each of the quad steering voltage members 174, 176,178,180 may be a time varying (e.g. an AC) voltage $V_{QSV}(t)$ in phase with the drive voltage source $V_D(t)$, which, during operation, may facilitate the reduction of undesired quadrature motion due in part to temperature fluctuations within the operating environment. For example, in those applications where temperature fluctuations can cause significant out-of-plane movement of the proof masses 108,110 in the sense axis direction, the use of AC quad steering voltages $V_{QSV}(t)$ may produce greater electrostatic forces between the quad steering voltage members 174,176,178, 180 and the proof masses 108,110 while also using less power. These increased electrostatic forces can be made sufficient to overcome the temperature-induced out-of-plane motion of the proof masses 108,110 as well as any other quadrature motion that may be present.

A variable or fixed-value resistor 300,302,304,306 disposed in series between the quad steering voltage $V_{QSV}(t)$ and each quad steering voltage member 174,176,178,180 can be provided to adjust the magnitude of the quad steering voltage signals 308,310,312,314 applied to each corresponding quad steering voltage member 174,176,178,180. In the illustrative embodiment of FIG. 13, for example, the resistors 300,302,304,306 are each depicted as potentiometers that can be used to vary the magnitude of the quad steering voltage signals 308,310,312,314 applied to the quad steering voltage members 174,176,178,180 based in part on the severity of the quadrature motion. If desired, a mechanical or electrical switch 316,318,320,322 can be provided to selectively switch-in each resistor 300,302,304,306 in series with the quad steering voltage $V_{QSV}(t)$.

The polarity of the quad steering voltages $V_{QSV}(t)$ applied to each proof mass 108,110 can be reversed to null the net quad steering voltage $V_{QSV}(t)$ signal at the input node 88 of the charge amplifier 166. Although not depicted in FIG. 13 for sake of clarity, it should be further understood that each of the quad steering voltage members 174,176,178,180 can be further split into separate quad steering voltage members each electrically isolated from each other, with the polarity applied to each respective half of the quad steering voltage member being reversed, as described herein, for example, with respect to FIG. 4.

In the illustrative embodiment of FIG. 13, the sense bias voltage Vs can be applied to either the proof masses 108,110 or to the sense electrodes 170,172 using a number of switches 324,326,328,330. A first set of switches 324,326, for example, can be configured to switch-in the sense bias voltages $+V_S$ and $-V_S$ on the first and second proof masses 108,110, respectively. A second set of switches 328,330, in turn, can be configured to switch-in the sense bias voltages $+V_S$ and $-V_S$ on the first and second sense electrodes 170,172, respectively. The position of the first set of switches 324,326 can be alternated with the position of the second set of switches 328,330 such that the sense bias voltages $+V_S$ and $-V_S$ are applied to either the proof masses 108,110 or the sense electrodes 170,172, but not both. It should be understood, however, that other configurations are possible.

The AC quad steering voltages used to control proof mass motion 108,110 can be applied to any of the quad steering voltage member embodiments described herein. Thus, while the AC voltage signals 308,310,312,314 in FIG. 13 are shown coupled to substantially rectangular-shaped quad steering voltage members 174,176,178,180, it should be understood that other alternative configurations such as that described above with respect to FIGS. 9–12 could also be implemented.

Figure 14:
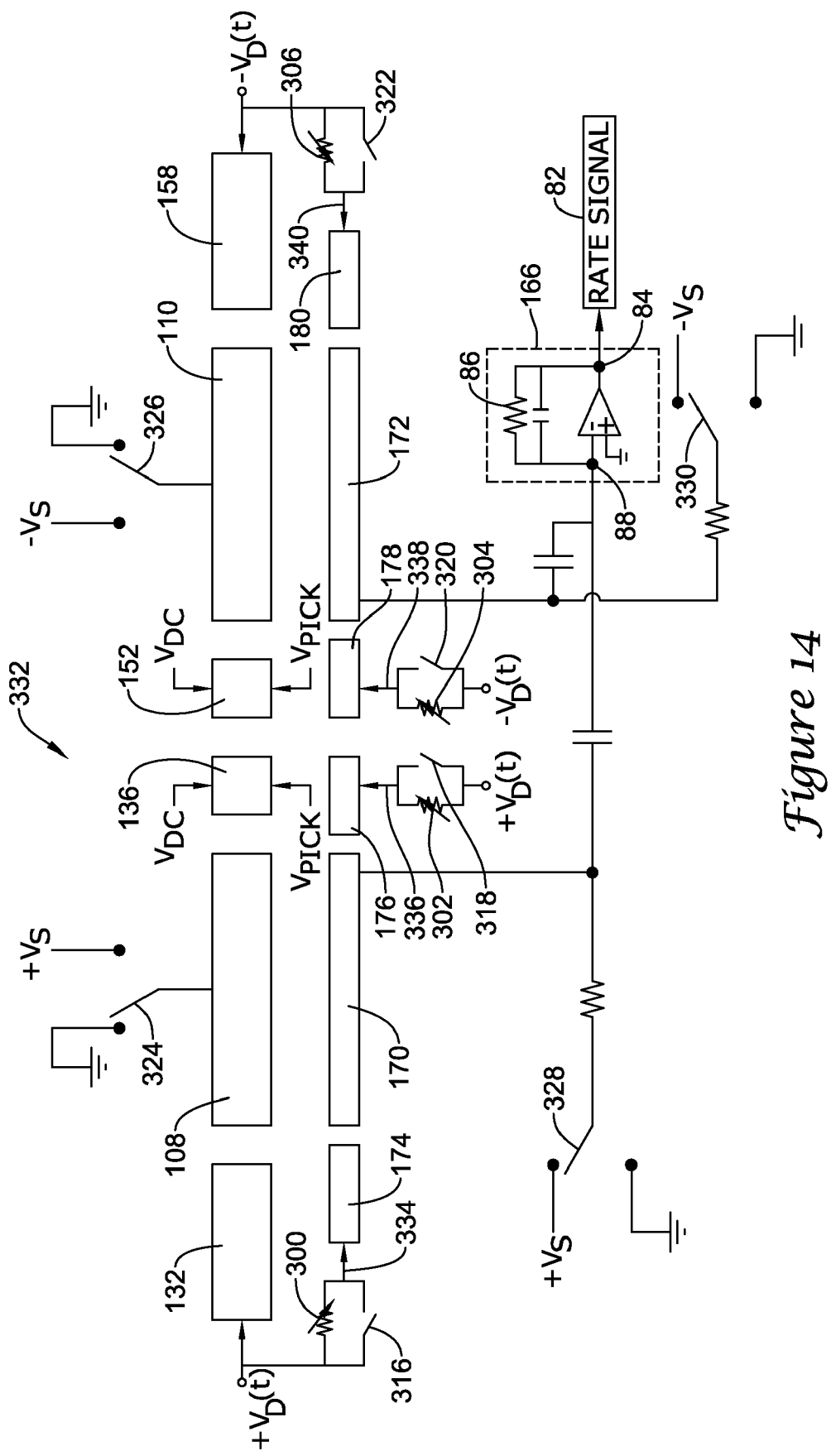
FIG. 14 is a schematic view showing another alternative system for reducing quadrature motion using AC quad steering voltages derived from the drive voltage source.

FIG. 14 is a schematic view showing another alternative system 332 for reducing quadrature motion using AC voltages derived from the drive system voltage $V_D(t)$ source. System 332 can be configured similar to system 296 described above, with like elements labeled in like fashion. In the illustrative embodiment of FIG. 14, however, the quad steering voltage signals 334,336,338,340 applied to each quad steering voltage member 174,176, 178,180 can include a component of the drive voltage $V_D(t)$ signal used to drive the proof masses 108,110. In such configuration, the resistors 300,302,304,306 disposed in series between the drive voltage $V_D(t)$ source and the quad steering voltage members 174,176,178,180 can be utilized to step-down the magnitude of the quad steering voltage signal 334,336,338,340 so that it is only a fraction of the magnitude of the drive voltage $V_D(t)$ signal.

Because the time-varying voltage signals 334,336,338, 340 applied to each of the quad steering voltage members 174,176,178,180 are in phase with the drive voltage $V_D(t)$ signal, the electrostatic force induced between the quad steering voltage members 174,176,178,180 and each respective proof mass 108,110 is in phase with any quadrature motion resulting from temperature fluctuations within the operating environment. Deriving the quad steering voltage signal from the drive voltage signal in this manner thus permits the system 332 to compensate for any temperature-induced quadrature motion of the proof masses 108,110.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. A MEMS gyroscope, comprising:
   one or more proof masses coupled to a time-varying drive voltage source, said one or proof masses configured to oscillate in a drive plane above a support substrate;
   at least one sense electrode positioned adjacent to each of the one or more proof masses;
   a sense bias voltage source coupled to the one or more proof masses, said sense bias voltage source adapted to produce a charge between the one or more proof masses and a corresponding sense electrode;
   sensing means for measuring the Coriolis force exerted on the one or more proof masses and outputting a rate signal corresponding to the rate of rotation of the gyroscope about an input axis; and
   one or more quad steering voltage members positioned adjacent to each of the one or more proof masses, each of said one or more quad steering voltage members being electrically coupled to a voltage.

2. The MEMS gyroscope of claim 1, wherein the voltage coupled to the one or more quad steering voltage members is a DC voltage.

3. The MEMS gyroscope of claim 1, wherein the voltage coupled to the one or more quad steering voltage members is an AC voltage.

4. The MEMS gyroscope of claim 3, wherein the AC voltage is in phase with the drive voltage source.

5. The MEMS gyroscope of claim 4, wherein the voltage coupled to the one or more quad steering voltage members is a component of the drive voltage source.

6. The MEMS gyroscope of claim 5, wherein the magnitude of the voltage applied to the one or more quad steering voltage members is less than the magnitude of the drive voltage source.

7. The MEMS gyroscope of claim 5, wherein the magnitude of the voltage applied to the one or more quad steering voltage members is substantially equal to the magnitude of the drive voltage source.

8. The MEMS gyroscope of claim 5, further comprising a resistive element disposed in series between the drive voltage source and each quad steering voltage member.

9. The MEMS gyroscope of claim 8, wherein the resistive element is a variable resistor.

10. The MEMS gyroscope of claim 8, wherein the resistive element is a fixed-type resistor.

11. The MEMS gyroscope of claim 1, wherein the voltages applied to the one or more quad steering voltage members are nulled.

12. The MEMS gyroscope of claim 1, wherein said sensing means includes a charge amplifier.

13. A MEMS gyroscope, comprising:
   one or more proof masses coupled to a time-varying drive voltage source, said one or more proof masses configured to oscillate in a drive plane above a support substrate;
   at least one sense electrode positioned adjacent to each of the one or more proof masses;
   a sense bias voltage for inducing a charge between the one or more proof masses and a corresponding sense electrode;
   one or more quad steering voltage members positioned adjacent to each proof mass, each of said one or more quad steering voltage members being electrically coupled to a resistive element in series with the drive voltage source; and
   sensing means for measuring the Coriolis force exerted on the one or more proof masses and outputting a rate signal corresponding to the rate of rotation of the gyroscope about an input axis.

14. A method for reducing errors in a gyroscope, comprising the steps of:
   providing a gyroscope including a time-varying drive voltage source coupled to one or more proof masses each adapted to oscillate back and forth in a drive plane above a sense electrode;
   providing one or more quad steering voltage members adjacent the proof mass; and
   applying a time-varying voltage to the one or more quad steering voltage members to electrostatically attract the proof mass towards the sense electrode to reduce any undesired quadrature motion of the one or more proof masses.

15. The method of claim 14, wherein the time-varying voltage coupled to the one or more quad steering voltage members is an AC voltage.

16. The method of claim 15, wherein the AC voltage is in phase with the drive voltage source.

17. The method of claim 14, wherein the time-varying voltage coupled to the one or more quad steering voltage members is a component of the drive voltage source.

18. The method of claim 17, wherein the magnitude of the time-varying voltage coupled to the one or more quad steering voltage members is less than the magnitude of the drive voltage source.

19. The method of claim 17, wherein the magnitude of the time-varying voltage coupled to the one or more quad steering voltage members is substantially equal to the magnitude of the drive voltage source.

20. The method of claim 14, further comprising the steps of:
   providing a sense bias voltage on each of the one or more proof masses; and
   measuring any Coriolis forces exerted on the one or more proof masses and outputting a rate signal corresponding to the rate of rotation of the gyroscope about an input axis.

* * * * *